United States Patent
Hayes

(10) Patent No.: US 7,038,167 B2
(45) Date of Patent: *May 2, 2006

(54) PENDANT CONTROL FOR A WELDING-TYPE SYSTEM

(75) Inventor: L. Thomas Hayes, Oshkosh, WI (US)

(73) Assignee: Illinois Tool Works Inc., Glenview, IL (US)

( * ) Notice: Subject to any disclaimer, the term of this patent is extended or adjusted under 35 U.S.C. 154(b) by 317 days.

This patent is subject to a terminal disclaimer.

(21) Appl. No.: 10/624,383

(22) Filed: Jul. 21, 2003

(65) Prior Publication Data

US 2004/0015258 A1    Jan. 22, 2004

Related U.S. Application Data

(63) Continuation of application No. 09/956,502, filed on Sep. 19, 2001, now Pat. No. 6,639,182.

(51) Int. Cl.
*B23K 9/10* (2006.01)

(52) U.S. Cl. .................................. 219/130.5

(58) Field of Classification Search ............. 219/130.5, 219/132
See application file for complete search history.

(56) References Cited

U.S. PATENT DOCUMENTS

| | | |
|---|---|---|
| 4,447,700 A | 5/1984 | Cohen |
| 5,305,183 A | 4/1994 | Teynor |
| 5,808,885 A | 9/1998 | Dew et al. |
| 6,115,273 A | 9/2000 | Geissler |
| 6,167,328 A * | 12/2000 | Takaoka et al. ............. 700/264 |
| 6,479,792 B1 * | 11/2002 | Beiermann et al. ....... 219/130.5 |
| 6,479,793 B1 | 11/2002 | Wittmann et al. |
| 6,486,439 B1 | 11/2002 | Spear et al. |
| 6,624,388 B1 * | 9/2003 | Blankenship et al. ..... 219/130.5 |
| 2002/0045970 A1 | 4/2002 | Krause et al. |
| 2002/0168937 A1 | 11/2002 | Clark et al. |

FOREIGN PATENT DOCUMENTS

| | | |
|---|---|---|
| EP | 734808 A2 | 10/1996 |
| WO | WO 01/12374 A1 | 8/2000 |

OTHER PUBLICATIONS

ALT 304, Miller® The Power of Blue Oct. 2000.
Maxstar® 200 SD, DX, And LX, Miller® The Power of Blue, Dec. 2000.
Wird OLE for Process Control (OPC) ein neuer Industriestandard? Jurgen Schmoll, Nurnberg May 1997.

* cited by examiner

*Primary Examiner*—Clifford C. Shaw
(74) *Attorney, Agent, or Firm*—George R. Corrigan

(57) ABSTRACT

A method and apparatus for programming a welding-type system is disclosed. They include storing at least one welding program in a pda and connecting the pda to the welding-type system. Then, the at least one welding program is downloaded to (or a program is uploaded from) the welding-type system. The controller includes a memory and a memory input is connected to the memory and connectable to a pda. The program may be delivered to the pda by email. The connection may be wired, such as RS232), or wireless, such as IR or RF. The program is edited in one embodiment. Also, the connection may be wireless and to a remote memory (such as on a desktop or laptop).

28 Claims, 2 Drawing Sheets

PENDANT CONTROL FOR A WELDING-TYPE SYSTEM

This application is a continuation of U.S. Pat. No. 09/956,502 filed on Sep. 19, 2001 now U.S. Pat. No. 6,639,182.

FIELD OF THE INVENTION

The present invention relates generally to the art of welding-type systems. More specifically, it relates to welding-type systems that have memory to store welding programs or schedules.

BACKGROUND OF THE INVENTION

Welding power supplies or systems are available for a wide variety of processes, and with a wide variety of sophistication. Welding-type power supply or system, as used herein, includes power supplies or systems that provide welding, cutting or heating power, and may include a controller, switches, etc. Traditionally, a good weld required an experienced welder, not only to properly execute the weld, but to properly select operating parameters (such as output voltage, current, power, pulse width, wire feed speed, etc.)

Now, robots are available that execute the weld. Also, operating parameters may be pre-determined and automatically implemented by a controller in the welding-type power supply. The automation is typically a software program that describes the output waveform, and is executed by a digital processor (microprocessors, DSPs, etc.). The program attempts to implement and improve upon the decisions that had been made by the experienced welder.

The programs or schedules may be stored in the system controller, and when executed the controller commands the welding-type power supply to provide the output called for by the schedule. One or more schedules may be stored in memory in the controller, and the user selects the program or schedule to execute from a user interface. Controller, as used herein, includes digital and analog, circuitry, discrete or integrated circuitry, microprocessors, DSPs, etc., and software, hardware and firmware, located on one or more boards, used to control a device such as a power supply. Weld program or schedule, as used herein, includes set up information and/or output information such as the weld sequence, output duration, output magnitude, and wave shape.

Often, a facility may have multiple weld cells performing the same task, and it is desirable to have the tasks performed identically by each cell. Using a robot, this can be done if the programs are identical. Also, as welding systems are used, a knowledge base of what works well for various types of applications is developed. By transferring successful programs from one weld cell to another, or from the manufacturer to a weld cell, the user can take advantage of the knowledge base.

Weld schedules were updated in the prior art in a number of ways. The schedule was sometimes input by hand—this worked, but can be slow and cumbersome, and prone to error, particularly as schedules become more complex. Another system involved pulling a pc board, and connecting it to a pc. This reduced errors, but required opening the welding power supply, and was not fast and easy. Even bringing a laptop to connect to the power supply directly is cumbersome and requires purchasing a laptop.

Accordingly, a simple and effective way to program a welding-type system is desirable. Preferably it will allow uploading of programs from one system, for downloading back to that system or to another system.

SUMMARY OF THE PRESENT INVENTION

According to a first aspect of the invention, a method of programming a welding-type system includes storing at least one welding program in a pda and connecting the pda to the welding-type system. Then, the at least one welding program is downloaded to the welding-type system.

According to a first aspect of the invention, a method of programming a welding-type system includes storing more than one welding program in a pda and connecting the pda to the welding-type system. At least one of the welding programs is selected and downloaded to the welding-type system.

According to a third aspect of the invention, a welding-type system includes a source of welding-type power operatively connected to a controller. The controller includes a memory and a memory input is connected to the memory and connectable to a pda. A downloading routine is operatively connected to the memory input.

According to a fourth aspect of the invention, a welding-type system includes a source of welding-type power operatively connected to a controller. The controller includes a memory and an i/o port. A pda has a memory and a plurality of weld programs stored therein. An i/o port on the pda is connected to the controller i/o port. The controller has a weld program selecting routine connected to the pda, and a downloading routine operatively connected to the memory input.

According to a fifth aspect of the invention, a program for storing weld schedules on a pda includes a storage routine, that stores at least one weld schedule in a memory on the pda, and a connection routine connects the pda to a welding-type system. A download routine downloads the at least one schedule to the welding-type system. A selection routine is provide if more than one schedules are stored.

According to a sixth aspect of the invention, a method of uploading programs from a welding-type system includes storing a plurality of welding programs in a memory in the welding-type system and selecting at least one of the plurality of programs for uploading. A connection from the welding-type system to a pda is made and at least one of the plurality of programs to the pda.

According to a seventh aspect of the invention, programming a welding-type system includes wirelessly connecting a remote memory to the welding-type system. Then, the at least one welding program is wirelessly transferred between the remote memory and the welding-type system.

Storing includes uploading from a second welding-type system and/or saving an e-mail attachment in various embodiments.

The connection is wired connection, such as RS232), or wireless, such as IR, in other alternatives.

Selecting is performed before or after connecting in various embodiments

The programs are stored in a single file, and downloading includes sending a portion of the file in another embodiment.

The program(s) is edited in yet another embodiment.

Other principal features and advantages of the invention will become apparent to those skilled in the art upon review of the following drawings, the detailed description and the appended claims.

Figure 1:
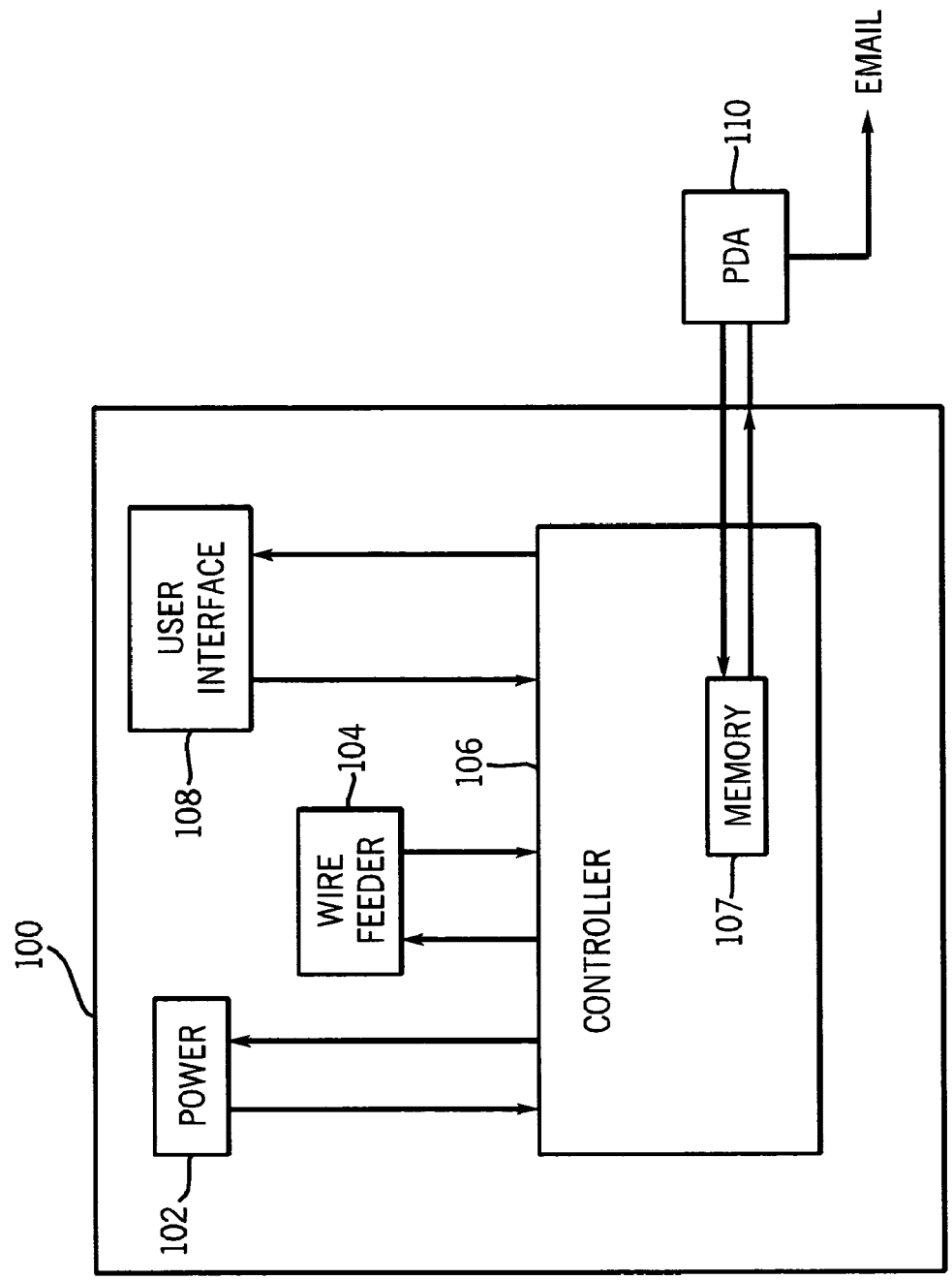
FIG. 1 is a diagram of a welding-type system in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to particular systems and components, it should be understood at the outset that the invention may be implemented with other systems and components, and used in other applications.

Generally, the invention provides for transferring weld schedules or programs between a pda and a welding-type system (particularly the controller of the system). The invention may be used for downloading files from the PDA to the controller, or for uploading files from the controller to the PDA. PDA, as used herein, includes personal digital assistants, handheld computers, and palmtops. This allows a weld schedule used in one welding systems to be transferred to another, as well as allowing for backing up a weld schedule stored in a welding system.

The PDA preferably stores multiple schedules, such as 64, in a single file. The preferred embodiment also provides for eight welding configurations (or set up information) to be stored, either in the single file, or in a second file. The user may download one or more schedules or programs by selecting one or more from the file. Then, the selected schedules are downloaded (rather than the entire file). This may be useful for controllers that store fewer than 64 schedules, or for transferring just a single schedule.

Additionally, the invention contemplates e-mailing welding schedules to and from the PDA. This may be particularly useful for troubleshooting welding schedules, obtaining welding schedules from the manufacturer, or sharing welding schedules between facilities.

The PDA also includes a program or routine that allows the user to select a particular weld schedule, and zoom in on a portion of that schedule. The user can edit the schedule by tapping on the screen, in either the normal or a zoom mode. Editing a weld program or schedule, as used herein, includes changing the sequence of outputs, and/or the wave shape, and/or the magnitudes of the outputs, and/or the timing of the outputs.

The connection between the PDA is an RS232 hardwired connection in the preferred embodiment. The PDA and the controller are preferably connected to each other is a serial protocol. Alternatives provide for other hardwired connections, such as an ethernet, or for a wireless connection such as IR or an RF connection, using a wireless protocol. Wireless protocol, as used herein, includes a protocol that allows two devices to communicate by a wireless connection.

Referring now to FIG. 1, a welding system 100, in accordance with the present invention, cooperates with the PDA 110 to implement the invention. Welding system 100 includes a source of welding-type power 102, a wire feeder 104, the controller 106 which includes memory 107, and a user interface 108. Source of welding-type power, as used herein, includes a source that delivers welding, plasma cutting or induction heating power.

Power source 102 may be any power source, and examples include the power supplies found in the Miller Alt304® or Miller MaxStar® welding systems, also described in U.S. patent application Ser. No. 09/540,567, filed Mar. 31, 2000, entitled Method And Apparatus For Receiving A Universal Input Voltage In A Welding, Plasma Or Heating Power Source, and one described in U.S. Pat. No. 6,115,273, entitled Power Converter With Low Loss Switching, issued Sep. 5, 2000, which is hereby incorporated by reference. In the preferred embodiment three parallel power sources are provided.

The components are operatively connected to provide a welding output. Operatively connected, as used herein, includes a connection, that may be hardware (wired or wireless) or software, by instructions. They further cooperate as described above, wherein programs may be downloaded from PDA 110 through an RS 232 connection 112 to controller 106, where it is passed on to memory 107 of controller 106. In an alternative embodiment connection 112 is a wireless connection, such as an IR connection.

Figure 2:
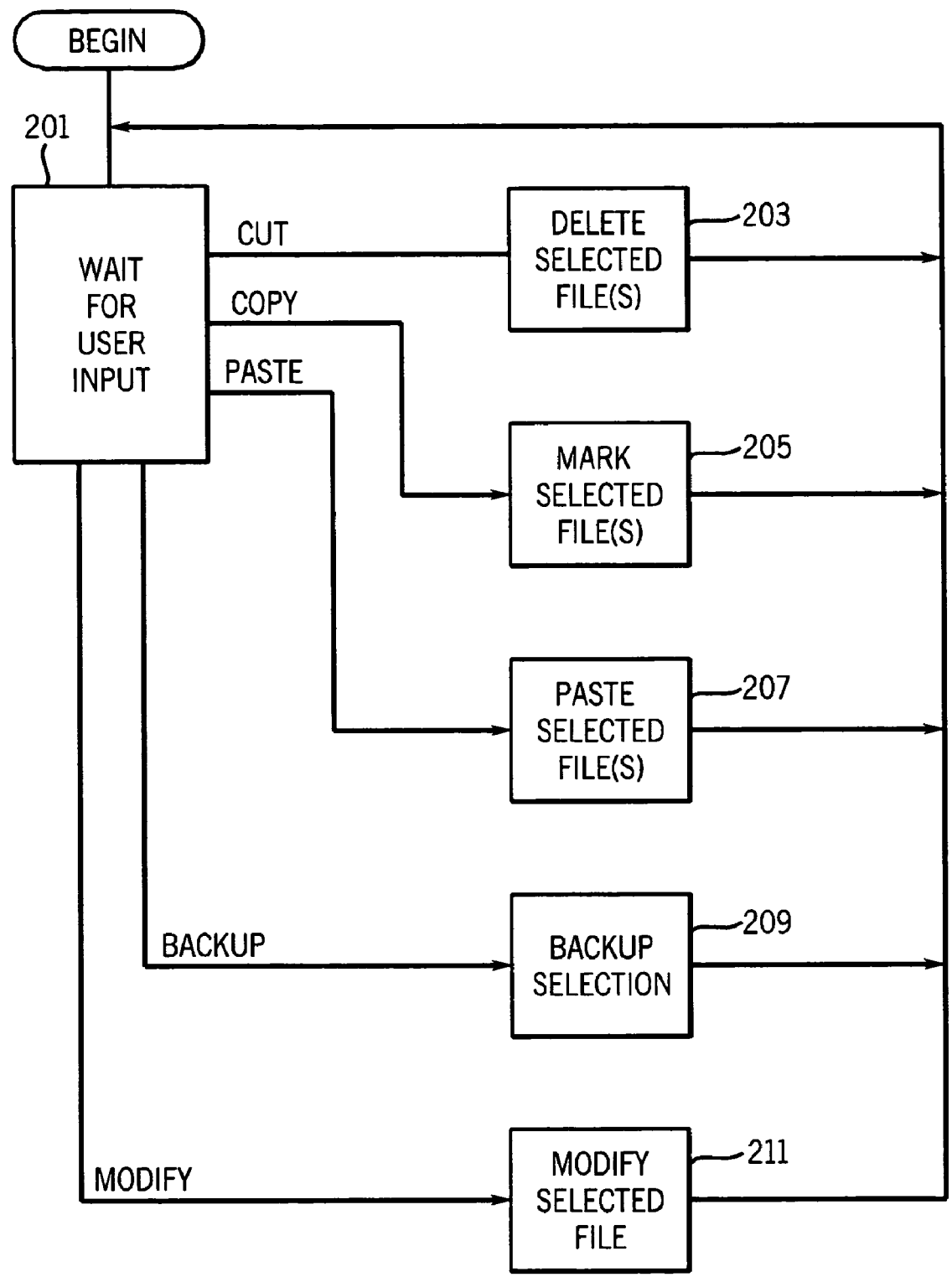
FIG. 2 is flow chart for a program for downloading and/or uploading weld schedule in accordance with the present invention.

Referring now to FIG. 2, a flowchart for a program that may be run on the PDA or by the controller that transfers schedules is shown. The program begins when the user starts the program (on the PDA in the preferred embodiment). When the program initializes it checks to seeing if the controller is online. If the controller is online a connection routine is executed that allows the PDA to access files on the controller. The connection routine may be a standard networking routine. Connection routine, as used herein, includes a routine that connects two devices, such as a palm and a controller. Routine, as used herein, includes software or hardware, digital or analog, that, when used, performs a function or task.

The program displays a collection of files to the user that includes, in the preferred embodiment, 64 schedules stored on pda 110, 8 configurations stored on pda 110, 8 schedules from system 100, 1 configurations from system 100, 4 backup files (each file containing 8 schedules and 1 configuration), 4 e-mail schedules, 1 e-mail configuration, and 1 e-mail system backup (8 schedules, 1 configuration). These files are displayed in a Windows setting, and a prompt "All" allows the user to select a subset of the files (such as the 8 configurations, e.g.).

The user selects a file, executing a weld program or schedule selection routine. Weld program selecting routine, as used herein, includes a routine that allows the user to select one or more weld schedules or programs from a plurality of schedules or programs. Then, the routine, at 201, waits for the user to input a command prompt, such as Cut, Copy, Paste, Backup, and Modify.

If the user selects Cut, then at 203 the routine deletes the selected file. If the user selects Copy, the selected file is marked for copying at 205.

If the user selects paste, the file stored in the clipboard is copied to the selected location at 207 (writing over the file previously stored at that location). If the user selects Backup, at 209 the system is backed up, as an upload or a download. Depending upon the origin and destination of the data, either a downloading routine or an uploading routine is executed. Downloading routine, or download routine, as used herein, includes a routine that downloads a file or weld schedule or programs from one device to another such as from a pda to a controller. Upload routine, as used herein, includes a routine that uploads a weld schedule or program. After the data has been sent, or while it is being sent, it is stored in a memory at the destination using a storage routine. Storage routine, as used herein, includes a routine that stores a weld schedule or program in memory.

If the user selects Modify, at 211 the user modifies the file as desired. Thus, an editing routine is executed. Editing routine, as used herein, includes a routine that allows the user to edit a weld schedule or program.

After whatever task was selected the task is completed the program returns to 201.

One alternative provides for a single routine to backup the schedules stored in the controller. The user selects backup when the program initiates and the routine automatically retrieves all schedules from the controller, and uploads those schedules to the PDA. This minimizes the user interaction.

Another alternative provides for the file transfer to occur by wireless connection (such as an RF connection) to a pda, laptop or desktop computer. In this embodiment, a receiver can be built into the welding-type system or connected to it, such as to the RS232 connection, or a device with a smaller microprocessor can be used to receive data remotely from the laptop, desktop, or other device, and retransmit it to the welding-type system. The transfer can be executed in the manner described above.

Numerous modifications may be made to the present invention which still fall within the intended scope hereof. Thus, it should be apparent that there has been provided in accordance with the present invention a method and apparatus for uploading and/or downloading files from a PDA to a controller that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

The invention claimed is:

1. A method of programming a welding type system, comprising:
   storing at least one welding program in a pda;
   connecting the pda to the welding-type system;
   downloading the at least one welding program to the welding-type system; and
   uploading the at least one program from a second welding-type system.

2. The method of claim 1, further comprising e-mailing the at least one program.

3. The method of claim 2, wherein connecting includes making a wireless connection between the pda and the welding-type system.

4. The method of claim 3, wherein connecting includes making an IR connection between the pda and the welding-type system.

5. The method of claim 1, wherein connecting includes making a wired connection between the pda and the welding-type system.

6. The method of claim 5, wherein connecting includes making an RS232 connection between the pda and the welding-type system.

7. A method of programming a welding-type system, comprising:
   storing a plurality of welding programs in a pda;
   connecting the pda to the welding-type system;
   selecting at least one of the plurality of programs for downloading; and
   downloading the at least one of the plurality of programs to the welding-type system; and
   uploading the at least one program from a second welding-type system.

8. The method of claim 7 wherein selecting is performed before connecting.

9. The method of claim 8, wherein connecting includes making at least one of an RS232 connection and an IR connection between the pda and the welding-type system.

10. The method of claim 7 wherein selecting is performed after connecting.

11. The method of claim 7, further comprising e-mailing the at least one program.

12. The method of claim 7, further comprising editing the at least one of the plurality of programs.

13. The method of claim 12, wherein editing is performed before downloading.

14. A method of programming a welding-type system, comprising:
   storing a plurality of welding programs in a pda;
   connecting the pda to the welding-type system;
   selecting at least one of the plurality of programs for downloading; and
   downloading the at least one of the plurality of programs to the welding-type system;
   wherein the plurality of programs are stored in a single file.

15. A method of programming a welding-type system, comprising:
   storing a plurality of welding programs in a pda;
   connecting the pda to the welding-type system;
   selecting at least one of the plurality of programs for downloading;
   downloading the at least one of the plurality of programs to the welding-type system; and
   editing the at least one of the plurality of programs before downloading, wherein the downloaded routine is stored in the controller.

16. The system of claim 15, further comprising a memory output, connected to the memory and further connectable to the pda.

17. The system of claim 15, wherein the memory input includes one of a wired or wireless connection.

18. The system of claim 15, wherein the memory input is one of an RS232 connection and an IR connection.

19. The system of claim 15, further comprising, a pda connected to the memory input, wherein the pda includes a memory with a weld program stored therein.

20. The system of claim 19, wherein the downloading routine is stored in the pda.

21. A program for storing weld schedule on a pda, comprising:
   a storage routine, that stores a plurality of weld schedules in a memory on the pda;
   a selection routine that allows the user to select at least one of the weld schedules for downloading;
   a connection routine connects the pda to a welding-type system;

a download routine that downloads the at least one schedule to the welding-type system; and an upload routine that allows the pda to upload at least one weld schedule from a second welding-type system.

22. The program of claim 21 wherein the selection routine is performed before the connection routine.

23. The program of claim 22, wherein the selection routine is performed after the connection routine.

24. The program of claim 21, further comprising an e-mail receive routine that allows the pda to upload at least one weld schedule from an email message.

25. The program of claim 21, further comprising an editing routine that allows the user to edit the at least one of the plurality of schedules.

26. A method of uploading programs from a welding-type system, comprising:

storing a plurality of welding programs in a single file in a memory in the welding-type system;

connecting a pda to the welding-type system; and selecting at least one of the plurality of programs for uploading;

uploading the at least one of the plurality of programs to the pda by uploading a portion of the single file.

27. A welding-type system, comprising:

a source of welding-type power;

a controller, operatively connected to the source of welding-type power, wherein the controller includes a memory and a controller wireless port;

a remote computing device, having a memory for storing a plurality of weld programs in a single file therein, and further having a remote wireless port connected to the controller wireless port;

a weld program selecting routine operatively connected to the device; and a transfer routine, operatively connected to the device that transfers a portion of the single file.

28. The system of claim 27, further comprising a download routine that allows the device to download at least one weld schedule from the device to the controller, wherein the at least one program is in an e-mail message.

* * * * *